United States Patent [19]
Yang

[11] Patent Number: 4,545,322
[45] Date of Patent: Oct. 8, 1985

[54] CONSTANT DRAG DEVICE

[75] Inventor: Elmer C. Yang, Orange, Calif.

[73] Assignee: Pacific Scientific Company, Anaheim, Calif.

[21] Appl. No.: 443,880

[22] Filed: Nov. 23, 1982

[51] Int. Cl.⁴ .............................................. B65H 59/10
[52] U.S. Cl. .......................................... 188/67; 16/85; 16/DIG. 17; 49/386; 74/531; 267/9 R; 267/71
[58] Field of Search ............... 188/166, 67; 267/9 B, 267/9 R, 33, 69, 70, 71, 72, 73, 134, 135, 140.3, 140.4, 141; 49/386; 16/44, 52, 58, 65, 82, 86 C, 86 R, 197, 337, 85, DIG. 17; 74/531

[56] References Cited

U.S. PATENT DOCUMENTS

| | | | |
|---|---|---|---|
| 2,088,450 | 7/1935 | Tea et al. | 267/9 |
| 2,732,787 | 5/1952 | Herlach | 89/44 |
| 2,808,903 | 1/1956 | Kovac | 188/67 |
| 3,053,526 | 9/1962 | Kendall | 267/1 |
| 3,116,056 | 12/1963 | Maier | 267/1 |
| 3,332,523 | 7/1967 | Chambers | 188/129 |
| 3,696,891 | 10/1972 | Poe | 188/268 |
| 3,765,053 | 10/1973 | Anweiler | 16/86 C X |
| 3,783,738 | 1/1974 | Pelat | 89/44 R |
| 3,805,608 | 4/1974 | Schmidt et al. | 73/167 |
| 3,866,724 | 2/1975 | Hollnagel | 188/129 |
| 4,054,190 | 10/1977 | Wilkes | 188/67 |

FOREIGN PATENT DOCUMENTS 1132053  10/1968  United Kingdom ................. 188/67

OTHER PUBLICATIONS

Ordinance Department publication 20-342, pp. 63-66, U.S. Patent Office, (Date not available, but it is understood to be prior art.).

Primary Examiner—Stoner, Jr., Bruce H.
Assistant Examiner—Michael P. Gilday
Attorney, Agent, or Firm—Knobbe, Martens, Olson & Bear

[57] ABSTRACT

A stretchable tube-like sleeve surrounds and frictionally grips an inner rod or tube. A coil spring surrounds the sleeve in position to resist movement of one end of the sleeve against the spring force. Moving the rod axially relative to the spring in a direction against the spring force on the sleeve decreases the inner diameter of the sleeve to produce a drag on the inner member. Movement of the opposite end of the sleeve is limited by a stop. This causes the sleeve to expand and allows the rod to slip with a constant drag which is determined by the strength of the spring. With the spring force in position to be applied to only one end of the sleeve, movement of the inner member in the opposite direction provides only a minimal drag as determined by the initial frictional interference between the sleeve and the inner member. Positioning the spring to resist movement of either end of the sleeve, provides a constant drag on the inner member with either direction of movement of the rod relative to the sleeve.

20 Claims, 5 Drawing Figures

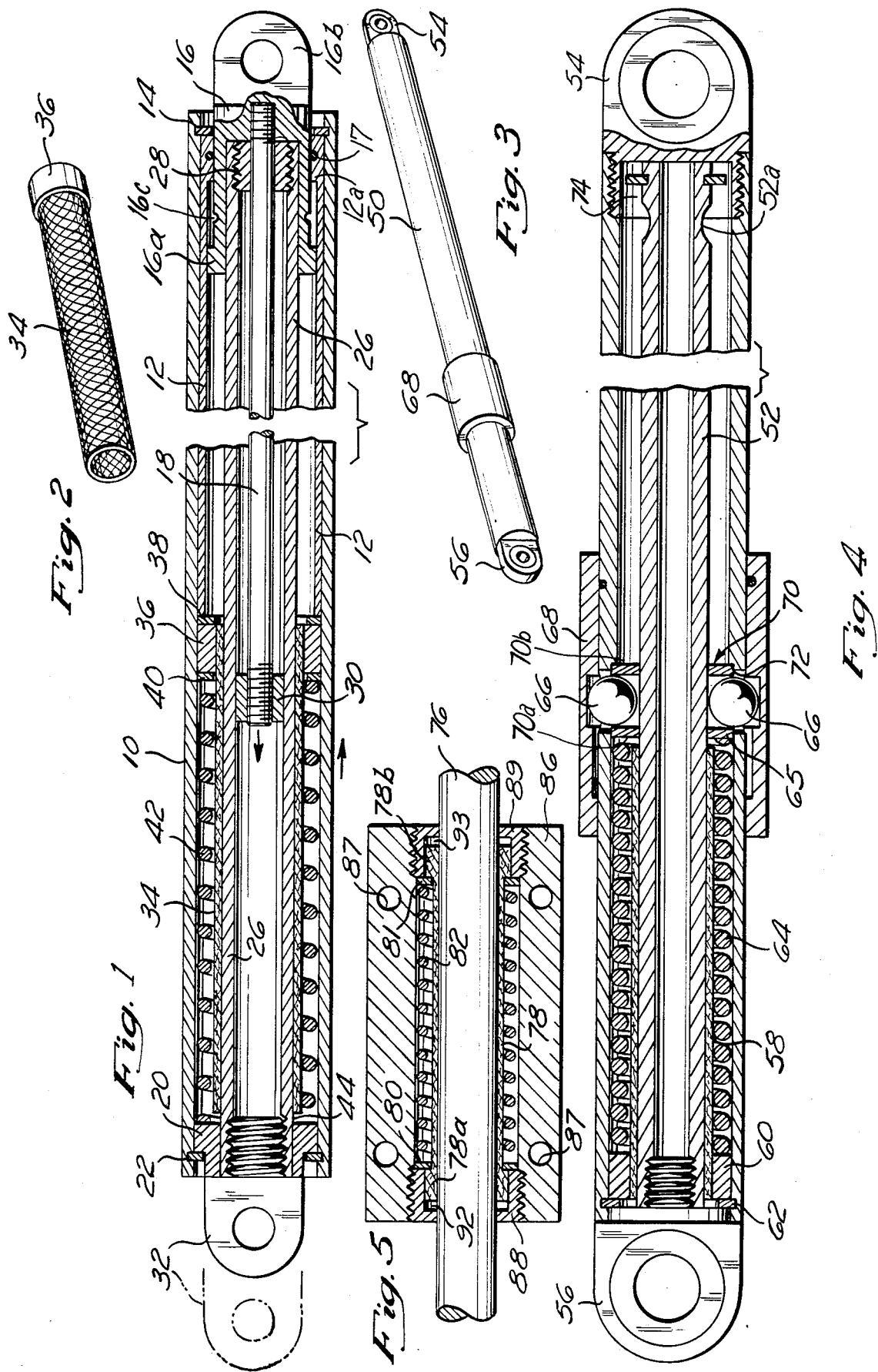

CONSTANT DRAG DEVICE

BACKGROUND OF THE INVENTION

This invention relates to devices for providing drag or resistance to movement of mechanical members, such as in a telescoping strut, or a rod sliding within a surrounding sleeve or tube. The devices obtained the drag by the friction arising from the sliding of dry surfaces which is sometimes referred to as Coulomb Damping. The amount of drag or resistance to sliding movement is, of course, a function of the coefficient of friction of the engaging surfaces. Although such coefficient is often treated as a constant, it actually changes with temperature, humidity, wear of the engaging surfaces, as well as other operating conditions.

In many mechanical arrangements or systems, it is desirable that one member be slidable with respect to another with a known amount of drag resisting such movement. Such predictability is helpful in the design and use of the drag device and the system in which it is employed. In one specific example, it is desirable that a swingable member, such as a door or cover, be opened or closed only by overcoming a known drag. Many commercial airliners are provided with overhead storage compartments which are manually opened and closed. In an arrangement wherein the bin portion swings downwardly from a closed position to an open position, a control means is employed that resists the downward opening movement so that it must be manually moved, thus preventing the compartment from falling quickly once it has been released. One known device for this purpose employs a plurality of balls in an elastomeric tube to provide the resistance. Such an arrangement has the advantage of being relatively inexpensive, but it has the great disadvantage that it wears out fairly quickly and must be replaced, which results in costly labor expense. In a large commercial airliner, it is reportedly necessary to replace or repair one of the devices almost every day of operation. Such a device provides drag that changes with changes in friction. Also, it is desirable that a minimum of friction be introduced during the upward closing movement of the bin so that the user only has to overcome the weight of the bin.

If the storage compartment has a door that swings upwardly in an opening direction, the reverse operation would be desirable. That is, it is desirable that drag be minimized in the upward opening direction and that a constant drag be provided in the closing direction to prevent the door from inadvertently slamming shut. Similarly, such a strut might be employed for holding other doors open, such as a cowl providing access to an engine nacelle in an airplane or other vehicle. In high temperature applications, a drag device not subject to changes in the coefficient of friction is particularly advantageous. Also, air or hydraulic dampers are often not practical in such areas.

In other situations, it may be necessary to maintain a constant resistance to the movement of one member relative to another in either of two opposite directions. In one such example, it is desirable that an aircraft control stick have a certain resistance to movement or "feel". Typically, this resistance to movement comes from the control cables and/or the control elements moved by the cables. However, in so-called "fly-by-wire" control systems that are primarily electronic, the pilot may only be moving an electrical potentimeter in moving the control stick. Since the moving of an electrical potentiometer provides no significant mechanical load, it is desired that an "artificial feel" be provided on the control cable or other element. It is important that this drag be substantially constant so that the control will always feel the same to the pilot.

These are but a few examples that illustrate that a need exists for simple but reliable devices which will provide a substantially constant frictional drag.

SUMMARY OF THE INVENTION

In accordance with the invention, such a device providing a substantially constant drag is disclosed herein. In its simplest form, a braking surface on a first member, such as a rod or a tube, is frictionally engaged by a braking element that provides an initial drag to make the unit function. Suitable spring means are employed to change the characteristics of the braking element in a manner that the engaging force provided by the element is increased such that relative movement between the braking surface and the braking element is not permitted until the moving force is sufficient to overcome the load determined by the spring means. The drag provided by the device is substantially independent of the coefficient of friction between the braking element and the braking surface, but instead is determined by the prestressing of the spring means selected.

In a preferred form of the invention, the braking element is an elongated tube-like sleeve which surrounds and grips the rod or tube with an initial frictional force. The characteristics of the gripping element are such that it can be physically elongated by means of an elongation force applied to the rod, such as by starting to move the rod axially, with movement of one end of the sleeve being resisted by the spring means, such as a coil spring surrounding the gripping element and cooperating with that end of the gripping element. This elongation of the gripping element reduces its diameter, thus, causing it to grip the gripped member with an increased force. This enhanced gripping force prevents relative axial movement between the gripping element and the gripped member until the drag introduced by the gripping element is overcome. This is accomplished by permitting the other end of the gripping element to engage a stop that results in a slight reduction in length of the gripping element so that gripping force is slightly reduced. The load to be overcome is thus determined by the strength of the spring means independent of changes in the coefficient of friction between the engaging surfaces of the gripping element and the gripped member.

Thus, for example, if it is desired that a substantially constant drag be provided to permit relative movement between the two components, it is only necessary to select the proper spring force. If the spring force is applied to only one end of the gripping elements, the drag as determined by the spring will only be in the direction of relative movement between the components which attempts to overcome this drag; whereas in the opposite direction or relative movement, the only drag to be overcome will be that initial gripping force provided by the gripping element without the effect of the spring means. In such form, the device of the invention is useful in the situations outlined above where it is desirable to resist the opening or closing of a component with a constant drag, while providing a minimum of load in the opposite direction.

Providing a spring to resist movement of one of either end of the gripping element will allow movement of the other spring end and will provide a constant drag to relative movement between the gripping element and the gripped member in either of two opposite directions. Such a device may be useful, for example, to provide an "artificial feel" to an aircraft control system, as discussed above.

In a preferred form of the invention, the gripping element is capable of being "stretched" so that its inner diameter will be reduced, and is somewhat "resilient" to provide for one way drag to provide for wear between the gripping element and the gripped member. In one form, the gripping element may be made of an elastomeric material which can be truly stretched and will have a certain amount of resilience to return to its initial condition when the stretching force is removed. However, in another form of the invention which is believed to be more durable, the gripping element is made of woven or braided strands that can be made of a variety of materials including metal. Such a woven tube can be elongated to reduce its inner diameter, and it can be shortened to increase its inner diameter by applying a shortening force on the element. Such an element is not actually stretched in the resilient sense but the result is comparable. Thus, when the word "stretched" is employed in this disclosure it is intended to include both the element being made of an actual resilient material as well as this woven construction, or any other structure that will provide a comparable effect.

The action provided by the gripping element is similar to that provided in a so-called "Chinese finger trap" wherein a person inserts a finger of each hand into opposite ends of a "stretchable" tube. If the tube is initially held in the tube ends while the tube is elongated an initial gripping force on the fingers is established. When the person attempts to pull both fingers out of the ends of the tube at the same time, the tube is elongated while its diameter is increased, with the result that the gripping force simply increases as the elongating force increases. The devices of the present invention utilize this principle by limiting the elongation of the gripping member at a predetermined level wherein the resistance to movement is substantially constant.

In one practical form of the invention, the gripped member forms one component of a telescoping strut while the other component is formed by a tubular member which is slidably mounted on the gripped member and encloses spring means and the gripping sleeve surrounding the gripped member. The spring means is in the form of a coil spring having one end reacting against a flange secured to the gripping element and the other end reacting against a flange secured to the outer telescoping strut member. Telescoping movement of the strut members in a direction to attempt to overcome the spring load applied to the flange secured to the gripping element results in the end of the gripping sleeve engaging a stop, which shortens the sleeve slightly until the moving force on the strut member is sufficient to overcome the constant drag as determined by the spring. Movement in the opposite telescoping direction of the strut members does not provide the elongating force so that only a minimal drag is introduced.

With the arrangement providing constant drag in both directions of movement, both ends of the spring react against flanges on the gripping element, but each flange is free to be moved away from the spring when stretched by rod movement.

As indicated above, the devices are very durable and reliable in that a spring, such as a coil spring, may be compressed an enormous number of times without substantially changing its characteristics. While there will be wear between the gripping sleeve and the gripped member, such wear does not affect the operation of the device since the spring determines the load. It is only necessary that there be some initial friction between the gripping element and the gripped member.

SUMMARY OF THE INVENTION

FIG. 1 is a cross-sectional view along the length of a strut illustrating one form of the invention wherein a constant drag is provided in one direction and minimal drag is introduced in the other direction.

FIG. 2 is a perspective view of the gripping element employed in the strut of FIG. 1.

FIG. 3 is a perspective view of the exterior of another form of strut of the invention providing constant drag in one direction.

FIG. 4 is a cross-sectional view along the length of the strut of FIG. 3.

FIG. 5 is a cross-sectional view along the length of a device providing constant drag in two opposite directions of axial movement.

DETAILED DESCRIPTION OF THE PREFERRED EMBODIMENTS

The device of FIG. 1 includes an outer tubular housing 10 which forms one telescoping member of a telescoping strut. Within the right half of the housing 10 is a cylindrical sleeve 12 which could be formed integral with the surrounding housing, but is formed as a separate component for manufacturing convenience. Axial movement between the member 10 and the sleeve 12 is prevented by a retaining snap ring 14 positioned within a groove in the housing 10. A tongue 16 is positioned in the right end of the strut having a tubular inner portion which slides within the sleeve 12, and an outer apertured portion 16b, which is adapted to be connected to a component in a using system. Slidable movement of the tongue out of the sleeve 12 is prevented by the engagement of a flange 16a on the inner end of the tongue with a flange 12a on the outer end of the sleeve 12. With the flange in that position, a retaining spring 17 carried by the sleeve 12 snaps into an annular groove 16c in the tongue 16. An extension rod 18 is threadably secured to the tongue 16 and extends axially with respect to the housing 10.

Positioned in the left end of the housing 10 is a ring-shaped bearing 20 which is maintained within the housing 10 by means of a retaining ring 22 that snaps into a mating groove in the inner wall of the housing. An inner strut member 26 in the form of an elongated tube slides within the bearing 20 and, as shown in the position of FIG. 1, also has its other end sliding within the inner tubular portion of the tongue 16. The movement of the inner strut member 26 is also guided by the rod 18 threaded to the tongue 16. More specifically, a bearing element 28 is threaded into the right end of the tubular member 26 and slides on the rod 18. The inner member 26 also slides on a tubular bearing element 30 threaded onto the opposite end of the rod 18. As may be visualized, the bearings 28 and 30 also serve as stops to limit the extending movement of the strut members. That is, when the strut is fully extended, the opposing axial faces of the bearings 28 and 30 engage.

A tongue 32 is threaded ino the outer end of the strut member 26 for connection to a component of a using system.

In accordance with the invention, there is positioned on the exterior of the inner strut member a tube-like sleeve 34 which forms a gripping element that frictionally engages the exterior of the gripped strut member 26. Secured to the right end of the sleeve gripping element 34 is a ring 36 that forms a flange on the gripping element. The gripping element 34 is preferably made of woven or braided flexible metal strands. Such tubing is currently readily available and typically employed as a hose protector. That is, the tubing slips over a hose made of rubber or other such material to protect the hose from damage while permitting it to flex.

Bearing washers 38 and 40 are positioned on opposite ends of the flange 36 with the washer 38 engaging the end of the sleeve 12. An elongated coil spring 42 is positioned in an annular space surrounding the sleeve 34, with its right end engaging the washer 40 and the left end engaging the bearing 20. With a metal sleeve and flange, the washers are not necessary but they are helpful for elastomeric materials.

OPERATION OF THE STRUT OF FIG. 1

In assembling the strut of FIG. 1, the sleeve gripping element 34 is pushed onto the exterior of the inner strut member 26 to the position shown in FIG. 1. The inner diameter of the sleeve 34 is slightly smaller than the outer diameter of the inner strut member 26 such that there is an initial frictional engagement between the two components. Actually, initial friction is only needed on the left end of the sleeve in FIG. 1, which is for operation with drag in only one direction. However, with metal braid, it may be simpler from a manufacturing standpoint to allow light interference throughout. Since the interference is not large, the sleeve 34 may be pushed into position relatively easily, particularly so because the inner diameter of the sleeve increases slightly when it is axially compressed in being pushed onto the inner member 26.

The coil spring 42 is placed under compression between the bearing 20 and the washer 40 when the unit is assembled. This preloading determines the drag by the sleeve. If the tongue 32 and the strut member 26 are urged to move to the left as indicated by the phantom lines in FIG. 1, while the tongue 16 on the opposite end of the strut is held stationary, movement of the inner strut member 26 is resisted by the spring 42 which opposes this movement through the gripping sleeve 34. However, the housing 10 and its sleeve 12, together with the inner member 26, can move with respect to the tongue 16 until the retaining spring 17 snaps into the groove 16c. Continued force in that direction causes the inner strut member 26 to be moved in the strut extending direction, sliding within the bearing 20 within the tongue 16, on the extension rod 18 through the bearing 28, and on the bearing 30 attached to the other end of the rod 18. This strut extending movement is resisted by the gripping element 34 and the spring 42 in that as the extending movement of the member 26 is started, the sleeve left end tends to move with the member 26 by virtue of the initial gripping friction of the gripping sleeve 34. The left end of the sleeve is free to move with the member 26 in view of the gap 44 between the sleeve end and the bearing 20, but the right end is restricted in movement by the spring 43 reacting against the washer 40. As the left end of the sleeve starts to move, an elongating or stretching force is applied to the sleeve moving from left to right. This elongation decreases its inner diameter and increases its gripping force on the inner member 26. This gripping force is greater than the preload spring force. Consequently, continuing the extending force causes the spring to start to compress. Since the gap 44 is small, the left end of the sleeve 34 is quickly stopped by the bearing 20. This reduces the stretch on the sleeve, and unloads its gripping force sufficiently to permit the member 26 to slide within the sleeve. The gripping force will, however, not fall below the level established by the initial spring load. The net result of these actions and reactions is substantially constant drag equal to the preset spring load. The strut can continue to move in the extending direction so long as the extending force is greater than the gripping force, as determined by the spring 42. This constant gripping force, as determined by the spring 42, is independent of the coefficient of friction between the braking surfaces.

The strut is illustrated in FIG. 1 in its fully retracted position. If after being extended it is then to be retracted, the gripping effect of the sleeve 34 is caused only by the initial friction between the sleeve 34 and the member 26. This is so because the sleeve wants to move with the member 26, but the right end of the sleeve 34 is restrained by its flange 36 engaging the washer 38 and the sleeve 12 which is restrained by the retaining ring 14. Thus, a compression or shortening load is applied to the sleeve 34 such that the resistance to the strut retracting movement is minimal.

The strut of FIG. 1 is therefore quite useful in a situation in which a constant load is desired in the strut extending direction and no load is desired in the strut retracting direction. One such situation is that described above wherein an overhead bin within a commercial airliner is swung downwardly to be opened. With one end 16 of the strut of FIG. 1 attached to a fixed support and the other end 32 attached to the bin as it is swung or pivoted downwardly, it is necessary to swing the bin with a positive force into open position, hence, preventing it from swinging abruptly open due to gravity once it has been released. Conversely, when the bin is to be raised to its closed position, there is no reason to resist movement since a positive force is already required to overcome gravity.

The opening or extending movement of the strut may be limited by any suitable stops. One such arrangement is illustrated in the strut of FIG. 1 by the bearing 28 secured to the inner strut member 26 engaging the bearing 30 attached to the rod 18, that is carried by the tongue 16 confined in the outer housing or strut member 10. During the initial opening movement, the tongue 16 slides a limited amount with respect to the housing 10 until the retaining spring 17 snaps into the groove 16c. This permits the strut to be extended without significant resistance for a small distance that enables the bin to be moved sufficiently to be unlatched, from a suitable latching means (not shown).

EMBODIMENT OF FIGS. 3 AND 4

The strut of FIGS. 3 and 4 functions essentially like that of FIG. 1 except that the drag is reversed. That is, in the strut extending direction essentially no load is provided and in the strut retracting direction a constant drag is provided. The strut of FIGS. 3 and 4 includes an outer tubular housing 50 which forms one of the telescoping strut members, and an inner tubular member 52 which forms the other telescoping strut member. A tongue 54 is attached to the outer strut member 50 for connection to an operating system, and a similar tongue 56 is threaded into the inner end of the inner member 52 for such connection purposes. A gripping tube-like sleeve element 58 surrounds the inner strut member 52 and is secured to a ring 60 on one end, which forms a flange of the gripping element 58. The ring 60 is retained within the outer housing member 50 by a retaining ring 62 snapped into a suitable groove in the housing. A coil spring 64 surrounds the sleeve 58, with one end of the spring engaging the flange 60 and the other end of the spring engaging one end 70a of a three-hole ring 70, which is limited in its axial movement by its other end 70b engaging a shoulder 72 on the inner wall of the housing 50. The ring 70 has a plurality of holes in the axial direction in which are confined balls 66 that form part of a locking and retaining mechanism. The balls are positioned within suitable holes in the outer housing 50 and are radially confined between the inner strut member 52 and an outer locking barrel 68. The locking balls 66 actually ride within an annular channel in the inner wall of the locking barrel 68. When the strut is moved to its fully extended position, a snap ring 74 on the end of the strut member 52 engages the ring end 70b, and the balls 66 fit within an annular groove 52a on the strut member. The locking barrel 68 may be slid to the right to hold the balls in the groove and thus lock the strut in its fully extended position.

As mentioned above, the drag on the extending and retracting movements of the strut of FIG. 4 is essentially the reverse of that of FIG. 1. In a strut extending movement with the inner strut member 58 moved to the left, the right end of the gripping sleeve 58 wants to move with the inner member 52; and since there is nothing restraining the right end, it will move with the inner member 52. The left end of the gripping sleeve cannot move with the inner tube 52 in that the flange 60 attached to the gripping sleeve is restrained by the retaining ring 62. The result is that the sleeve is only subjected to a compressive force, which permits the tube 52 to move with only a minimal amount of friction between it and the restrained gripping sleeve 58.

By contrast, if the strut is extended and then compressed to be retracted into the position shown in FIG. 4, the gripping sleeve again wants to move with the inner tube, but the coil spring 64 engaging the flange 60 resists movement of the left end of the sleeve and prevents movement of that end of the sleeve until the force is sufficient to overcome the preload of the spring. The right, unrestrained sleeve end starts to move with the inner tube 52 so that the sleeve is stretched and an increased gripping force is provided. Note that the slight gap between the right end of the sleeve and the adjacent washer 64 permits slight sleeve movement towards the ring 70. As the strut retracting force continues, the spring starts to compress and the right end of the sleeve engages ring flange 70a, thus, shortening the sleeve. This reduces the gripping force allowing the tube 52 to slide, with a constant drag thereon from the sleeve as determined by the spring.

As mentioned above, the strut of FIG. 4 is useful in connection with controlling the movement of a door or cowl such as over an aircraft engine nacelle, wherein it is desirable that little or no drag be provided by the strut when the cover is being lifted, and a positive drag force is desired in the closing direction, so as to prevent the cowl from closing. Additionally, the locking barrel prevents closure due to gust wind loads in the fully opened position.

EMBODIMENT OF FIG. 5

In FIG. 5, a central rod or gripped member 76 is shown with a gripping element 78 frictionally engaging the rod. Each end of the gripping element 78 is provided with an outwardly extending flange 78a and 78b, giving the gripping element somewhat of an elongated spool-like cross section. A pair of washers 80 and 81 respectively engage the flanges 78a and 78b with the washers extending radially beyond the flanges. A coil spring 82 is axially compressed to a desired preload between the washers such that an elongating or stretching force is applied to the gripping element through its end flanges.

The gripping element may have a braided construction, such as that illustrated in FIG. 2, with flanges being secured to both ends, or it may be formed as illustrated in FIG. 5 with the gripping element being made of an elastomeric material and the flanges being formed integral with the body of the gripping sleeve. Note that the resiliency of the material permits the washers and the spring to be mounted on the sleeve before it is positioned on the rod.

This gripping assembly, that is, the sleeve, the washers and the spring, is confined within a surrounding housing having a cylindrical interior for receiving the gripping assembly. The housing may be secured by suitable fasteners (not shown) extending through the holes 87 in flange portions of the housing. The ends of the housing are closed by ring-shaped plugs or bearings 88 and 89 which thread into the ends of the housing, and which include inner surfaces that form slide bearings for the inner rod 76. The inner ends of the elements 88 and 89 are formed with a cylindrical recess for receiving the flanged ends of the gripping sleeve 78, whereas the washers 80 and 81 have a larger diameter than this recessed portion such that they cannot fit within them. Note also that the axial length of the sleeve flanges 78a and 78b is less than the axial depths of the recesses in the bearing elements 88 and 89, such that a gap 92 and 93 is respectively formed between the ends of the sleeve and the adjacent bearing element 88 and 89.

In use, if the rod is moved to the right in FIG. 5, the gripping sleeve 78 will try to move with it; and since the sleeve 78 is stretched between the ends of the spring 82, the spring will also try to move with it. However, the right end of the spring will be stopped by structure after a very short movement. That is, the washer 81 will engage the inner face of the bearing 89 and the spring is, of course, engaging the washer. Although the movement of the right end of the spring is stopped, the sleeve right end 78b is still free to move with the rod 76 because of the gap 93. However, the left sleeve end 78a is restrained by the force of the spring 84. As a result, the sleeve 78 is stretched further a slight amount thus amplifying the gripping force on the rod from right to left.

As long as the drag force on the left end of the tubular sleeve 78 is greater than the preset spring force, the sleeve will move with the rod and will compress the spring. As the spring is compressed, the tube is allowed to shorten, and the gripping force is reduced. Although the gripping force starts to reduce, it will never fall below the level established by the initial spring load. If the drag force should fall below the spring force, the spring will stretch the tube and the drag force will increase. The net result of these actions and reactions is to exert a constant drag on the rod equal to the preset spring load.

As long as the coefficient of friction between the sleeve 78 and the rod 76 exceeds a certain minimum value, it has no effect on the drag force, just as in the one way drag arrangements of the devices in FIGS. 1 and 4. In other words, changing conditions of temperature and humidity, which usually affect the the coefficient of friction will not change the drag rate unless the friction falls below the minimum level necessary to start the "Chinese finger trap" effect.

As mentioned above, the arrangement of FIG. 5 is particularly useful in connection with a pilot control system, such as in an aircraft, wherein the control is provided by electrical or other circuitry that does not provide force feedback from the control element to the pilot's control lever. By connecting the control rods 76 into the control linkages, the device will provide a constant drag that will be felt by the pilot based on movement of the rod in either direction.

Of course, the device of FIG. 5 can be constructed as a telescoping strut, wherein the housing 86 would be one of the telescoping strut members, such that movement of the strut members in either direction would be subjected to the constant drag force.

The devices described herein can be useful in many different applications and the devices can be constructed differently while still obtaining the constant drag. For example, an elastomeric brake element could frictionally engage a surrounding brake surface and be axially compressed to increase its braking effect. Suitable stops can be utilized to limit compression so that the braking action is determined by a preloaded spring.

I claim:

1. A device for providing a substantially constant drag or resistance to movement comprising:
   an inner member;
   a sleeve frictionally gripping said member, said sleeve being constructed such that it can be axially stretched to reduce its diameter to increase its grip on the inner member;
   spring means for providing an opposing force on one end of said sleeve to resist movement of the sleeve produced by moving said inner member in a sleeve streching direction against the force of the spring means, the other end of said sleeve being movable with the inner member relative to said spring in the sleeve stretching direction; and
   means limiting movement of said sleeve other end in the direction opposing the spring force whereby further movement of the inner member and said other sleeve end against the urging of said spring means will unload said spring means sufficiently to reduce the stretching and, thus, the gripping force of said sleeve on said member sufficiently to permit the member to slide relative to said sleeve.

2. The device of claim 1 including means for restraining movement of said spring means when said inner member is moved in said spring opposing direction.

3. The device of claim 1 wherein said spring means force is provided at each end of said sleeve and each end is movable with the inner member in a stretching direction a limited amount.

4. The device of claim 1 wherein said opposing force is applied to one end of said sleeve while the other end of the sleeve is unrestrained except for its initial grip on the gripped member whereby the gripping force on the gripped member when it is moved in one direction is determined by said spring means and the gripping force on said member when it is moved in the opposite direction is that provided by the unstretched sleeve.

5. The device of claim 4 wherein said spring means is a compression spring which surrounds said sleeve and wherein said sleeve includes an outwardly extending flange which cooperates with one end of the spring to receive said spring means opposing force.

6. The device of claim 5 including a housing surrounding said spring having an inwardly extending flange which cooperates with the other end of the compression spring to restrain the spring when the inner member is moved in said direction.

7. The device of claim 1 wherein said opposing force is applied to both ends of said sleeve such that axial movement of said inner member relative to said sleeve is limited in either direction until the moving force is sufficient to overcome the spring force and reduce the gripping force as determined by said spring means and thereby provide a constant drag.

8. The device of claim 7 wherein said sleeve is provided with a pair of outwardly extending flanges, said spring is a compression spring surrounding said sleeve with its ends being restrained by said flanges in a manner such that the spring provides a stretching force on the sleeve.

9. The device of claim 8 including means for restraining axial movement of said spring while permitting either sleeve flange to move with said inner member away from its spring end whereby the opposing force on the other flange provided by said spring results in further stretch on the sleeve and increase in the gripping force, until the force for moving said inner member is sufficient to compress said spring allowing the sleeve to engage a stop and shorten thereby reducing the gripping force of said sleeve on the inner member.

10. The device of claim 8 including a washer around either end of said sleeve respectively engaging the flange on either end and extending radially outward from the flange to be engaged by the ends of the coil spring, the inner diameter of the coil spring being larger than the outer diameter of the sleeve flanges such that the sleeve can move axially while the washers and the spring may be restrained.

11. The device of claim 1 wherein said sleeve is made of elastomeric material which enables it to be stretched.

12. The device of claim 1 wherein said sleeve is constructed of braided strands of metal or other material that permit the sleeve to be elongated with a stretching force is applied, but enable it to shorten when the stretching force is removed.

13. A device for providing a substantially constant drag or resistance to movement in one direction while presenting a minimal drag to movement in the opposite direction, comprising:
   a tube-like sleeve constructed in a manner that it can be elongated reducing its diameter and will shorten and increase its diameter when the elongating force is removed;
   an elongated member slidably positioned within said sleeve, the diameters of said member and the unstretched sleeve being such that the sleeve frictionally grips the member with an initial gripping force;
   spring means for applying an opposing force to one end of said sleeve to resist movement of the sleeve against said opposing force;

means for restraining the opposing force applying means in a manner to permit the gripped member and the other end of the sleeve to be moved in a direction opposite to the elongating force whereby the gripped member is more strongly gripped by the sleeve when it is moved in said direction; and means for limiting movement of said sleeve other end in said direction so that movement of the gripped member in said direction overcomes the spring opposing force and reduces the length of the sleeve and hence, the gripping force sufficiently to cause the sleeve to provide a substantially constant drag on said member as determined by the spring opposing force.

14. The device of claim 13 wherein the opposing force applied to the sleeve is applied in only one direction such that when the gripped member is moved in the same direction as the opposing force on the sleeve, the movement of the gripped member is only resisted by the initial gripping force of the sleeve.

15. The device of claim 14 wherein the sleeve includes an outwardly extending flange and the means for providing the opposing force on the sleeve is a compression spring which surrounds the sleeve and is compressed between the flange and another restraining surface.

16. A device comprising:
an elongated member;
a spool-shaped sleeve surrounding said member for frictionally engaging and gripping the member to resist axial movement of the member relative to the sleeve;
a coil compression spring surrounding the sleeve applying an elongating force to the sleeve which reduces the diameter of the sleeve causing it to grip the member, the sleeve ends being movable relative to said spring with said member in sleeve stretching directions to provide a greater gripping force to compress said spring; and
restraining means which restrains axial movement of the sleeve when compressing said spring to unload said spring thus reducing its gripping force and permitting sliding movement between the gripped member and the sleeve when the moving force is greater than the drag on the gripped member provided by the sleeve as determined by the strength of the spring.

17. The device of claim 16 wherein the restraining means includes a structure enclosing the sleeve and the spring and having means that engages the spring to restrict its movement while initially permitting the sleeve and the gripped member to be moved relative to the spring to the point where the sleeve is restrained relative to said member.

18. A method of providing a constant drag or resistance to movement of an elongated member comprising:

gripping the member with an initial gripping force by positioning on the member a tube-like sleeve having an inner diameter slightly smaller than the elongated member so that the sleeve frictionally engages the member, the sleeve being constructed in a manner that enables it to be stretched to decrease its inner diameter;

positioning a spring to provide a predetermined opposing force to one end of the sleeve;

moving the elongated member and said sleeve in a sleeve stretching direction while maintaining the opposing force on said sleeve end thereby increasing the gripping force; and limiting movement of said sleeve in said stretching direction while continuing movement of said member to overcome said spring force thereby decreasing the length and gripping force of said gripping sleeve sufficiently to permit continued movement of said member relative to said sleeve so long as the moving force on the member is greater than the gripping force provided by said sleeve, as determined by said predetermined opposing force.

19. The method of claim 18 including applying an opposing force to both ends of said sleeve whereby movement of said member relative to the sleeve in either axial direction is permitted until the moving force is greater than the gripping force of the sleeve as determined by the opposing forces on the sleeve.

20. A device for providing a substantially constant drag or resistance to movement comprising:
an elongated inner member;
a tubular sleeve surrounding and lightly frictionally gripping said member, said sleeve being constructed such that it can be axially stretched to reduce its diameter to increase its grip on the inner member;
a flange attached to one end of the sleeve;
a coil spring surrounding the sleeve;
an outer member surrounding the coil spring with the spring being compressed between the structure attached to said outer member and said flange, with the flange being further restrained by additional structure connected to the outer member, such that the flange end of the sleeve is restrained while the other member of the sleeve is unrestrained; and
stop means attached to said outer member adjacent said sleeve unrestrained end to form a gap between the unrestrained end and the stop so that when the inner member is moved, together with the free end of the sleeve in a direction to close said gap, the gripping force of said sleeve is increased to become greater than said spring force so that the spring is compressed allowing the free end of the sleeve to close the gap and engage said stop, thereby allowing the sleeve to shorten slightly and reduce its grip so as to provide a constant drag on said inner member as determined by said spring force.

* * * * *